United States Patent [19]
Batliner et al.

[11] Patent Number: 5,172,780
[45] Date of Patent: Dec. 22, 1992

[54] HARD METAL OR HARD MATERIAL TIPPED DRILLING, CHIPPING AND CUTTING TOOLS

[75] Inventors: Rainer Batliner, Schaanwald, Liechtenstein; Maximilian Stöck, Azmoos, Switzerland

[73] Assignee: Hilti Aktiengesellschaft, Liechtenstein

[21] Appl. No.: 794,122

[22] Filed: Nov. 15, 1991

[30] Foreign Application Priority Data

Nov. 17, 1990 [DE] Fed. Rep. of Germany ....... 4036777

[51] Int. Cl.$^5$ .............................................. E21B 10/46
[52] U.S. Cl. .................................... 175/435; 228/124; 228/56.3
[58] Field of Search ................. 228/124, 56.3; 51/293; 175/435

[56] References Cited

U.S. PATENT DOCUMENTS

| | | | |
|---|---|---|---|
| 3,986,255 | 10/1976 | Mandal | 228/124 X |
| 4,117,968 | 10/1978 | Naidich et al. | 228/124 |
| 4,518,662 | 5/1985 | Listemann et al. | 228/56.3 |
| 4,854,495 | 8/1989 | Yamamoto et al. | 228/124 |
| 4,907,665 | 3/1990 | Kar et al. | 175/410 |

Primary Examiner—Ramon S. Britts
Assistant Examiner—Frank S. Tsay
Attorney, Agent, or Firm—Anderson Kill Olick & Oshinsky

[57] ABSTRACT

Precipitation hardenable solders are used for securing hard metal or hard material parts to the support member of a tool for drilling, chipping or cutting rock or hard construction materials. The support member is formed of steel. The hard metal or hard material parts are secured to the support member by soldering using a precipitation hardenable solder. The parts secured to the support member are subjected after a solution treatment to the tempering and precipitation hardening temperature.

4 Claims, No Drawings

HARD METAL OR HARD MATERIAL TIPPED DRILLING, CHIPPING AND CUTTING TOOLS

BACKGROUND OF THE INVENTION

The present invention is directed to soldered connections between hard material or hard metal parts and a steel support member. Hard metal tipped drilling, chipping and cutting tools have found wide acceptance, particularly for work on rock and construction materials. Accordingly, hard metal or hard material parts are used in the region of the drilling or chipping tip or cutting edge to increase the useful life of such tools and are distinguished by particularly low wear and the ability to work under high stresses. In producing such tools usually a support member formed of a more or less alloyed steel is provided with a recess in which a plate shaped hard metal or hard material part is inserted. The part inserted in the recess is secured by soldering.

Because of the different materials used in such tools, especially in the highly loaded region, there are special requirements for the material used for securing the hard metal parts to the support member. This is particularly significant, since the hard metal parts must project in the axial and/or radial direction beyond the support member of the drilling, chipping and cutting tools in the tip region. Though the hard metal parts are positively locked in the recesses of the support member, high and complex stresses involving compression, tension and shearing stresses develop at the connection during operation of the tool. The different thermal expansion characteristics of the connected parts cause additional high cooling stresses in the region of the soldered connection. As a result, the thermal expansion coefficient of the hard metal and the support member steel are in a ratio of approximately 1:3. Damage to the soldered connection can be avoided only if the solder, after the soldering process and during the cooling period is plastically deformable or ductile. Since high ductility means low strength, this characteristic is undesirable in actual practice.

As a result, there are special conditions which the solder used for connecting the hard metal with the support must meet. Accordingly, the solder must be ductile and capable of compensating for the different expansion behavior of the hard metal and the steel during the cooling process. At the same time, the solder must have a high strength, to counter the high dynamic stresses developed during the operation of the tool.

SUMMARY OF THE INVENTION

In accordance with the present invention, it has been found that an advantageous connection of the hard metal or hard material parts with the steel support member of the tool can be achieved, if a precipitation hardenable solder is used for connecting the parts.

Based on the present invention, the solders used are distinguished by high ductility after quenching and high strength after precipitation hardening. Such behavior corresponds to the requirements for connecting hard materials with steel, that is, the connecting material has ductility during the quenching process for compensating for the different coefficients of expansion, and higher strength after precipitation hardening for absorbing the high stresses when working on rock or hard structural materials.

Copper alloys and metal alloys have been found to be particularly suitable as the solder. Copper-nickel-silicon alloys are preferred, especially with nickel contents in the range of 1% to 3% by weight and silicon content in the range of 0.4% to 1% by weight. Other alloys have also been found suitable, such as copper-beryllium and copper-beryllium alloys with 1.8%–2.1 or 0.4%–0.7% by weight of beryllium and 2.0%–2.9% by weight of cobalt, copper-zirconium and copper-zirconium-chromium alloys with zirconium contents in the range of 0.1%–0.3% or 0.03%–0.3% by weight and 0.3%–1.2% by weight of chromium, and copper-titanium alloys with up to 5% by weight of titanium where, neglecting the usually impurities, the residual share is formed of copper. The following chart indicates examples of suitable alloys:

| Alloys | Cu | Ti | Be | Co | Mn | Cr | Ni | Si | Zr |
|---|---|---|---|---|---|---|---|---|---|
| Cu Be 2 | Rest | | 1.8/2.1 | | | | | | |
| Cu Co 2 Be 2 | Rest | | 0.4/0.7 | 2.0/2.9 | | | | | |
| Cu Ni 2 Be | Rest | | 0.2/0.6 | | | | 1.4/2.0 | | |
| Cu Ni 1.5 Si | Rest | | | | | | 1.0/1.6 | 0.4/0.7 | |
| Cu Ni 2 Si | Rest | | | | 0/0.8 | | 1.6/2.5 | 0.5/0.8 | |
| Cu Cr Zr | Rest | | | | | 0,.3/1.2 | | | 0.03/0.3 |
| Cu Zr | Rest | | | | | | | | |
| Cu Ti | Rest | 1.0/5.0 | | | | | | | 0.1/0.3 |

For the manufacture of hard metal tipped drilling and chipping tools, in accordance with the invention, initially an unhardened or hardened tool steel support can be used. If an unhardened steel support member is utilized, then the soldering process and the hardening of the steel are combined (solder hardening). During the soldering process, the steel is simultaneously austenitized. Because of the hardening of the steel, the cooling process must proceed rapidly. At the same time, the solder is transformed into a ductile state by the solution heat treatment. When using precipitation hardenable solder, the tempering process for the steel and the precipitation hardening treatment can be combined, since both processes occur at comparable temperatures and within comparable time periods. Precipitation hardening in situ, that is, at the site, is also possible. If at the outset a hardened steel of martensitic texture is used, for instance, induction soldering of hardened tool supports, there occurs a solution heat treatment during the soldering process and the precipitation hardening due to an additional heating to the respective temperature of the tool at a subsequent random point in time, at the latest during use of the tool, even if the steel has already been subjected to a tempering treatment. The drilling and chipping tool embodying the invention can use unhardened as well as hardened steel, whereby the process for precipitation hardening of the soldered connection also possibly serves for hardening the steel support member of the tool. In any case, it is possible to proceed so that initially the hardened metal or hardened material parts are soldered to the support member of the tool by a solder, and possibly after quenching the entire tool for hardening the support member and the (simultaneous) solution heat treatment of the solder. A tempering process can follow as a special step or in situ, which tempering process (simultaneously) causes the precipitation hardening. The tempering or precipitation hardening temperature is at temperatures over 250° C., especially over 280° C., and frequently in the range of approximately 300° C., whereby such solders are preferred which during tempering (heating) to these temperatures ranges can be precipitation hardened when cooled, while precipitation hardening temperatures up to approximately 450° and above are also permissible. It is also possible to do without the tempering process, since tempering or precipitation hardening temperatures are reached during working conditions, for instance, when working on rock.

Hard metal tipped drilling and chipping tools, where the hard metal parts are soldered to the support member, are also part of the invention, where, in accordance with the invention, the hard metal parts are joined with the support member formed of steel by precipitation hardened solder. Preferably, the precipitation hardened solder is a copper alloy, particularly a Cu-Ni-Si alloy or one of the alloys mentioned above as a possible solder.

EXAMPLE 1

| SOLDERING OF ROCK DRILLS | DIAMETER: 12 mm |
| --- | --- |
| Solder | Cu Ni 2 Si (2% Ni, 0.65% Si) |
| Hard Metal | WC with 12% Co. |
| Steel Support Member | 34 Cr Ni Mo 6 |
| Soldering Conditions | High vacuum, soldering temperature 1100° C. Quenching: Nitrogen 2 bar Solder Hardness HV1: 132 |
| Precipitation | 280° C. 1 hour Solder Hardness Hv1: 157 |

EXAMPLE 2

| SOLDERING OF ROUGHING TOOL BITS PERIPHERY: 40 × 40 mm | |
| --- | --- |
| Solder | Cu Ti 5 (5% Ti) |
| Hard Metal | WC with 12% Co. Pins diameter 5 mm, 25 pieces |
| Steel Support Member | 34 Cr Ni Mo 6 |
| Soldering Conditions | High vacuum, soldering temperature 1050° C. Quenching: Nitrogen 2 bar Solder Hardness HV1: 240 |
| Precipitation Hardening | 450° C. 1 hour Hardness of solder HV1: 282 |

While specific embodiments of the invention have been described in detail to illustrate the application of the inventive principles, it will be understood that the invention may be embodied otherwise without departing from such principles.

We claim:

1. Drilling, chipping and cutting tools for working on rock and hard construction materials, comprising a support member, one of a hard metal or hard material part for effecting the drilling, chipping or cutting work, and a precipitation hardenable solder securing the hard metal or hard material part to the support member.

2. Drilling, chipping and cutting tools, as set forth in claim 1, wherein the precipitation hardenable solder is at least one of a copper alloy or a nickel alloy.

3. Drilling chipping and cutting tools, as set forth in claim 2, wherein the precipitation hardenable solder is selected from one of the group consisting of Cu-Ni-Si, Cu-Be, and Cu-Zr alloys.

4. A method of forming drilling, chipping and cutting tools for working on rock and hard construction materials comprising the step of using a precipitation hardenable solder for securing one of a hard metal or hard material part to a support member, said solder being a copper alloy or a metal alloy, said alloy being selected from the group consisting of Cu-Ni-Si, Cu-Be and Cu-Zr.

* * * * *